US011056750B2

(12) United States Patent
Xiao et al.

(10) Patent No.: US 11,056,750 B2
(45) Date of Patent: Jul. 6, 2021

(54) MICROLAYER MEMBRANES, IMPROVED BATTERY SEPARATORS, AND METHODS OF MANUFACTURE AND USE

(71) Applicant: Celgard, LLC, Charlotte, NC (US)

(72) Inventors: Kang Karen Xiao, Mississauga (CA); Eric Joseph Penegar, Fort Mill, SC (US); Takahiko Kondo, Shiga (JP); Robert Nark, Fort Mill, SC (US); Eric Robert White, Fort Mill, SC (US); Xiaomin Zhang, Charlotte, NC (US); Kristoffer K. Stokes, Lunenburg, MA (US)

(73) Assignee: Celgard, LLC, Charlotte, NC (US)

( * ) Notice: Subject to any disclaimer, the term of this patent is extended or adjusted under 35 U.S.C. 154(b) by 126 days.

(21) Appl. No.: 15/773,201

(22) PCT Filed: Nov. 11, 2016

(86) PCT No.: PCT/US2016/061510
§ 371 (c)(1),
(2) Date: May 3, 2018

(87) PCT Pub. No.: WO2017/083633
PCT Pub. Date: May 18, 2017

(65) Prior Publication Data
US 2018/0323417 A1 Nov. 8, 2018

Related U.S. Application Data

(60) Provisional application No. 62/253,932, filed on Nov. 11, 2015.

(51) Int. Cl.
*H01M 2/16* (2006.01)
*H01M 10/0525* (2010.01)
(Continued)

(52) U.S. Cl.
CPC .......... *H01M 50/449* (2021.01); *B01D 69/12* (2013.01); *B01D 71/26* (2013.01); *H01M 10/0525* (2013.01); *H01M 50/411* (2021.01)

(58) Field of Classification Search
CPC ............ H01M 2/1686; H01M 2/1653; H01M 10/0525; H01M 50/449; H01M 50/411; B01D 69/12; B01D 71/26
See application file for complete search history.

(56) References Cited

U.S. PATENT DOCUMENTS

2006/0141351 A1   6/2006  Suh
2008/0057389 A1*  3/2008  Kono ................. B01D 67/0009
                                                       429/144
(Continued)

FOREIGN PATENT DOCUMENTS

EP    2111911 A1    10/2009
JP    2007-141497 A   6/2007
JP    2008-255306 A  10/2008

OTHER PUBLICATIONS

P. Arora and Z. Zhang, "Battery Separators", Chem. Rev. 2004, 104, pp. 4419-4462.

*Primary Examiner* — Jayne L Mershon
(74) *Attorney, Agent, or Firm* — Hammer & Associates, P.C.

(57) ABSTRACT

In accordance with at least selected embodiments, a battery separator or separator membrane comprises one or more co-extruded multi-microlayer membranes optionally laminated or adhered to another polymer membrane. The separators described herein may provide improved strength, for example, improved puncture strength, particularly at a certain thickness, and may exhibit improved shutdown and/or a reduced propensity to split.

13 Claims, 11 Drawing Sheets

(51) Int. Cl.
*H01M 50/449* (2021.01)
*B01D 71/26* (2006.01)
*B01D 69/12* (2006.01)
*H01M 50/411* (2021.01)

(56) References Cited

U.S. PATENT DOCUMENTS

2011/0223486 A1 9/2011 Zhang et al.
2013/0344375 A1 12/2013 Brant et al.
2014/0079980 A1* 3/2014 Halmo ............... H01M 2/1686
              429/144

* cited by examiner

MD Cross-Section at 15,000X

MD Cross-Section at 15,000X

MD Cross-Section of R0384 at 5,000X

Surface of R0384 at 3,000X

Surface of R0384 at 10,000X

Surface of R0384 at 30,000X

MICROLAYER MEMBRANES, IMPROVED BATTERY SEPARATORS, AND METHODS OF MANUFACTURE AND USE

CROSS REFERENCE TO RELATED APPLICATIONS

This application claims priority to and the benefit of U.S. provisional patent application Ser. No. 62/253,932 filed Nov. 11, 2015, hereby fully incorporated by reference herein.

FIELD OF THE INVENTION

The disclosure or invention relates to novel or improved membrane layers, membranes or separator membranes, battery separators including such membranes, and/or related methods. In accordance with at least selected embodiments, the disclosure or invention relates to novel or improved porous membranes or separator membranes, battery separators including such membranes, and/or related methods. In accordance with at least certain embodiments, the disclosure or invention relates to novel or improved microporous membranes or separator membranes, microlayer membranes, multi-layer membranes including one or more microlayer membranes, battery separators including such membranes, and/or related methods. In accordance with at least certain selected embodiments, the disclosure or invention relates to novel, optimized or improved microporous membranes or separator membranes having one or more novel or improved exterior layers and/or interior layers, microlayer membranes, multi-layered microporous membranes or separator membranes having exterior layers and interior layers, some of which layers are created by co-extrusion and all of which layers are laminated together to form the novel, optimized or improved membranes or separator membranes. In some embodiments, certain layers comprise a homopolymer, a copolymer, and/or a polymer blend. The invention also relates to methods for making such a membrane, separator membrane, or separator, and/or methods for using such a membrane, separator membrane or separator, for example as a lithium battery separator. In accordance with at least selected embodiments, the present application or invention is directed to novel or improved multi-layered and/or microlayer porous or microporous membranes, separator membranes, separators, composites, electrochemical devices, batteries, methods of making such membranes, separators, composites, devices and/or batteries. In accordance with at least certain selected embodiments, the present invention is directed to a novel or improved separator membranes that are multi-layered, in which one or more layers of the multi-layered structure is produced in a multi-layer or microlayer co-extrusion die with multiple extruders. The improved membranes, separator membranes, or separators may preferably demonstrate improved shutdown, improved strength, improved dielectric breakdown strength, and/or reduced tendency to split.

BACKGROUND OF THE INVENTION

Methods for reducing splitting in microporous battery separator membranes, as well as particular split resistant or tear resistant microporous membranes, are discussed in U.S. Pat. No. 6,602,593. Such patent describes, among other things, a method that includes extruding a film precursor by a blown film method and using a blow-up ratio (BUR) of at least about 1.5 during blown film extrusion.

U.S. Pat. No. 8,795,565 describes, among other things, a biaxial stretching technique involving both MD and TD stretching of a dry process precursor membrane with a controlled MD relax process step. Biaxially stretched membranes, such as the membranes shown in FIGS. 1-3 of the U.S. Pat. No. 8,795,565 patent, may have some reduced splitting or tearing. When a biaxially stretched microporous membrane is strength tested using a puncture strength test method, the test sample puncture site may be a round hole as opposed to an elongated split.

U.S. Pat. No. 8,486,556 discloses, among other things, a multi-layered battery separator membrane with increased strength. A high molecular weight polypropylene resin having a certain melt flow index was used to produce multi-layered separators described in the U.S. Pat. No. 8,486,556 patent.

Also described are wet process microporous battery separator membranes which are also typically uniaxially or biaxially stretched and which may have balanced MD and TD strength properties. Examples of microporous membranes produced using a wet process may be disclosed in U.S. Pat. Nos. 6,666,969; 5,051,183; 6,096,213; and 6,153,133.

Various known methods of making microporous multi-layered membranes, such as for use as battery separator membranes, include laminating or adhering more than one monolayer precursor together or coextruding more than one layer of membrane at the same time using a coextrusion die. The aforementioned methods may not fully optimize a balance of strength and/or performance properties for r use in applications such as certain primary and/or secondary batteries, such as lithium ion rechargeable batteries.

Hence, there is a need for a novel or improved co-extruded or laminated, multi-layered microporous membrane, base film, or battery separator having various improvements, such as improved tensile strength and improved dielectric breakdown strength.

SUMMARY OF THE INVENTION

In accordance with at least selected embodiments, the present application or invention may address the above needs or issues, may address the need for a novel or improved co-extruded or laminated, multi-layered porous, macroporous, mesoporous, microporous, or nanoporous membrane, base film, or battery separator having various improvements, such as improved tensile strength and improved dielectric breakdown strength, and/or may provide novel or improved co-extruded and/or laminated, multi-layered and/or multi-microlayered (or multi-nanolayered) microporous membranes, base films, or battery separators possibly preferably having various improvements, such as improved shutdown, mechanical strength, porosity, permeability, splittiness (reduced splitting), tensile strength, oxidation resistance, adhesion, wettability, and/or dielectric breakdown strength, and/or novel or improved membrane layers, membranes or separator membranes, battery separators including such membranes, and/or related methods. In accordance with at least selected embodiments, the disclosure or invention relates to novel or improved porous membranes or separator membranes, battery separators including such membranes, and/or related methods. In accordance with at least certain embodiments, the disclosure or invention relates to novel or improved microporous membranes or separator membranes, microlayer membranes, multi-layer membranes including one or more microlayer membranes, battery separators including such membranes, and/or related methods. In accordance with at least certain selected embodiments, the disclosure or invention relates to novel, optimized or improved microporous membranes or separator membranes having one or more novel or improved exterior layers and/or interior layers, microlayer membranes, multi-layered microporous membranes or separator membranes having exterior layers and interior layers, some of which layers are created by co-extrusion and all of which layers are laminated together to form the novel, optimized or improved membranes or separator membranes. In some embodiments, certain layers comprise a homopolymer, a copolymer, and/or a polymer blend. The invention also relates to methods for making such a membrane, separator membrane, or separator, and/or methods for using such a membrane, separator membrane or separator, for example as a lithium battery separator. In accordance with at least selected embodiments, the present application or invention is directed to novel or improved multi-layered and/or microlayer porous or microporous membranes, separator membranes, separators, composites, electrochemical devices, batteries, methods of making such membranes, separators, composites, devices and/or batteries. In accordance with at least certain selected embodiments, the present invention is directed to a novel or improved separator membranes that are multi-layered, in which one or more layers of the multi-layered structure is produced in a multi-layer or microlayer co-extrusion die with one or more extruders feeding the die (typically one extruder per layer or microlayer). The improved membranes, separator membranes, and/or separators may preferably demonstrate improved shutdown, improved strength, improved dielectric breakdown strength, and/or reduced tendency to split.

In accordance with at least certain embodiments, the present application or invention may address the above needs or issues and/or may provide novel or improved porous membranes or substrates, separator membranes, separators, composites, electrochemical devices, batteries, methods of making such membranes or substrates, separators, and/or batteries, and/or methods of using such membranes or substrates, separators and/or batteries. In accordance with at least certain embodiments the instant battery separator may comprise one or more co-extruded multi-layer membranes of like and/or distinct polymers or co-polymers laminated or adhered to another membrane. For instance, and not meant to be limiting, in certain embodiments, an inventive battery separator may comprise at least two co-extruded multi-layer membranes of like and/or distinct polymers or co-polymers that are laminated or adhered to each other or to another polymer membrane (monolayer or multi-layer membrane of like and/or distinct polymers or co-polymers). For example, a battery separator in one embodiment may comprise, but is not limited to, a polyethylene/polyethylene/polyethylene (PE/PE/PE) coextruded trilayer membrane laminated to a polypropylene (PP) monolayer and, in some embodiments, further laminated to another PE/PE/PE coextruded trilayer membrane to form the following constructions, [PE/PE/PE]/PP/[PE/PE/PE] or [PE/PE/PE]/PP or PP/[PE/PE/PE]/PP or [PE/PE/PE]/PP/PP or [PE/PE/PE]/[PE/PE/PE]/PP or other multi-layer constructions, where each of the individual co-extruded polymer layers are preferably micrometer or nanometer in thickness (microlayers or nanolayers). In other embodiments, a PE/PE/PE coextruded trilayer membrane may be laminated to a coextruded PP/PP/PP trilayer membrane, and in some embodiments, further laminated to another PE/PE/PE or PP/PP/PP coextruded trilayer membrane to form the following constructions, [PE/PE/PE]/[PP/PP/PP]/[PE/PE/PE] or [PP/PP/PP]/[PE/PE/PE]/[PP/PP/PP] or [PE/PE/PE]/[PP/PP/PP] or [PE/PE/PE]/[PE/PE/PE]/[PP/PP/PP] or [PE/PE/PE]/[PP/PP/PP]/[PP/PP/PP] or other multi-layer constructions, where each of the individual co-extruded polymer layers are preferably micrometer or nanometer in thickness (microlayers or nanolayers). In still other embodiments, a PP/PE/PP or PP/PP/PP or PE/PE/PE or PE/PP/PE or PP/PP/PE or PE/PE/PP coextruded trilayer membrane may be laminated to a coextruded PP/PP/PP or PE/PE/PE or PP/PE/PP or PE/PP/PE or PP/PP/PE or PE/PE/PP trilayer membrane, and in some embodiments, further laminated to another PP/PP/PP or PE/PE/PE or PP/PE/PP or PE/PP/PE or PP/PP/PE or PE/PE/PP coextruded trilayer membrane to form the following constructions, [PP/PE/PP]/[PP/PP/PP]/[PE/PE/PE] or [PP/PE/PP]/[PE/PE/PE]/[PP/PP/PP] or [PP/PP/PP]/[PE/PE/PE]/[PP/PP/PP] or [PP/PE/PP]/[PP/PE/PP]/[PP/PE/PP] or [PE/PE/PE]/[PE/PE/PE]/[PE/PE/PE] or [PE/PE/PE]/[PE/PE/PE] or [PE/PE/PE]/[PP/PP/PP] or [PP/PP/PP]/[PP/PP/PP] or [PP/PP/PP]/[PP/PP/PP]/[PP/PP/PP] or [PE/PE/PE]/[PE/PE/PE]/[PP/PP/PP] or [PP/PP/PP]/[PP/PP/PP]/[PE/PE/PE] or [PE/PE/PP]/[PP/PP/PP] or [PP/PP/PP]/[PP/PP/PE] or [PE/PP/PP]/[PP/PP/PP]/[PP/PP/PE] or [PE/PE/PP]/[PP/PE/PE] or [PP/PP/PP]/[PP/PP/PE]/[PP/PE/PE] or other combinations or multi-layer constructions, where each of the individual co-extruded polymer layers are preferably micrometer or nanometer in thickness (microlayers or nanolayers). In yet still other embodiments, a PP/PE/PP or PP/PP/PP or PE/PE/PE or PE/PP/PE or PP/PP/PP or PE/PE/PP or PP+PE/PP/PP or PP+PE/PP/PP+PE or PP+PE/PP+PE/PP+PE or PP+PE/PE/PE or PP+PE/PP/PE or PP+PE/PE/PP or other coextruded trilayer membranes of PP, PE or PP+PE may be laminated to a coextruded PP/PE/PP or PP/PP/PP or PE/PE/PE or PE/PP/PE or PE/PP/PP or PE/PP/PP or PP+PE/PP/PP or PP+PE/PP/PP+PE or PP+PE/PP+PE/PP+PE or PP+PE/PE/PE or PP+PE/PP/PE or PP+PE/PE/PP or other trilayer membranes of PP, PE, or PP+PE, and in some embodiments, further laminated to another PP/PE/PP or PP/PP/PP or PE/PE/PE or PE/PP/PE or PE/PP/PP or PE/PE/PP or PP+PE/PP/PP or PP+PE/PP/PP+PE or PP+PE/PP+PE/PP+PE or PP+PE/PE/PE or PP+PE/PP/PE or PP+PE/PE/PP or other coextruded trilayer membranes of PP, PE, or PP+PE to form the following constructions, [PP/PE/PP]/[PP/PP/PP] or [PP/PE/PP]/[PE/PE/PE] or [PP/PP/PP]/[PE/PE/PE] or [PP/PE/PP]/[PP/PE/PP] or [PP/PE/PE]/[PE/PE/PE] or [PE/PE/PE]/[PE/PE/PE] or [PE/PE/PE]/[PP/PP/PP] or [PP/PP/PP]/[PP/PP/PP] or [PP/PP/PP]/[PP/PP/PP]/[PP/PP/PP] or [PE/PE/PE]/[PE/PE/PE]/[PP/PP/PP] or [PP/PP/PP]/[PP/PP/PP]/[PE/PE/PE] or [PP/PE/PE]/[PE/PE/PE] or [PP/PP/PP]/[PE/PE/PE] or [PE/PP/PP]/[PP/PP/PE] or [PP+PE/PP/PP]/[PP/PP/PP+PE] or [PP/PE/PP]/[PP/PP/PP]/[PE/PE/PE] or [PP/PE/PP]/[PE/PE/PE] or [PP/PP/PP]/[PP/PP/PP]/[PE/PE/PE]/[PP/PP/PP] or [PP/PE/PP]/[PP/PE/PP]/[PP/PE/PP] or [PP/PE/PP]/[PP/PE/PP]/[PP/PE/PP] or [PE/PE/PE]/[PE/PE/PE]/[PE/PE/PE] or [PE/PE/PE]/[PE/PE/PE] or [PP/PP/PP]/[PP/PP/PP] or [PE/PE/PE]/[PE/PE/PE]/[PP/PP/PP] or [PP/PP/PP]/[PP/PP/PP]/[PE/PE/PE] or [PP/PE/PE]/[PE/PE/PEMPE/PE/PP] [PP/PP/PE]/[PE/PE/PE]/[PE/PP/PP] or [PE/PP/PP]/[PP/PP/PP]/[PP/PP/PE] or [PP+PE/PP/PP]/[PP/PP/PPMPP/PP/PP+PE] or [PP/PE/PP]/[PP/PE/PE] or [PE/PP/PE]/[PE/PP/PP] or [PE/PP/PP]/[PP/PE/PP] or [PP+PE/PP/PP]/[PP/PP/PP+PE] or [PP+PE/PP/PP+PE]/[PP+PE/PP+PE/PP+PE] or [PP+PE/PE/PE]/[PP+PE/PP/PE] or [PP+PE/PE/PP]/[PP+PE/PP/PE]/[PP+PE/PE/PP] or other combinations or subcombinations of PP, PE, or PP+PE layers (blends, mixtures, or co-polymers), microlayers, nanolayers, or combinations thereof, or other multi-layer constructions, where each of the individual co-extruded polymer layers are preferably micrometer or nanometer in thickness (microlayers or nanolayers).

Although certain multi-layer polymer membrane embodiments (bi-layer, tri-layer, quad-layer, penta-layer, . . . ) may be preferred (and that one or more layers, treatments, materials, or coatings (CT) and/or nets, meshes, mats, wovens, or non-wovens (NW) may be added on one or both sides, or within the multilayer membrane (M) which may include one or more co-extruded layers or sub-layers (CX), such as, but not limited to, CT/M, NW/M, CT/M/CX, CT1/M/CT2, CT/CX1/CX2/NW, CT1/CX1/CX2/CX3/CT2, CT/CX1/CX2, NW/CX1/CX2, NW1/CX1/CX2/CX3/NW2, CT/NW/CX1/CX2, CX1/NW/CX2, CX1/CT/CX2, and or combinations or subcombinations of M, CX, CT, and/or NW), it is also contemplated that single layer or mono-layer or multi-layer membranes (M) or embodiments made up of one or more microlayers or nanolayers of PP, PE, or PE+PP (preferably more than one) (and that one or more coatings (CT) and/or non-wovens (NW) may be added on one or both sides of the membrane (M or CX), such as, but not limited to, CT/M, NW/M, CT/M/CX, CT/CX/NW, CT1/CX/CT2, NX1/CX/NW2, CT/CX/NW/CT, NW1/CX/NW2/CT, CT1/NW/CT2, and or combinations or subcombinations of M, CX, CT, and/or NW) and may include constructions PP or PE or PE+PP or PP/PE or PP/PP or PE/PE or PP+PE/PP or PP+PE/PP+PE or PP+PE/PE or PP/PE/PP or PP/PP/PP or PE/PE/PE or PE/PP/PE or PE/PP/PP or PE/PE/PP or PP+PE/PP/PP or PP+PE/PP/PP+PE or PP+PE/PP+PE/PP+PE or PP+PE/PE/PE or PP+PE/PP/PE or PP+PE/PE/PP coextruded membranes which may be laminated to one or more other membranes (extruded or coextruded) PP or PE or PE+PP or PP/PE or PP/PP or PE/PE or PP+PE/PP or PP+PE/PP+PE or PP+PE/PE or PP/PE/PP or PP/PP/PP or PE/PE/PE or PE/PP/PE or PE/PP/PP or PE/PE/PP or PP+PE/PP/PP or PP+PE/PP/PP+PE or PP+PE/PP+PE/PP+PE or PP+PE/PE/PE or PP+PE/PP/PE or PP+PE/PE/PP membranes, and in some embodiments, further laminated to another PP or PE or PE+PP or PP/PE or PP/PP or PE/PE or PP+PE/PP or PP+PE/PP+PE or PP+PE/PE or PP/PE/PP or PP/PP/PP or PE/PE/PE or PE/PP/PE or PE/PP/PP or PE/PE/PP or PP+PE/PP/PP or PP+PE/PP/PP+PE or PP+PE/PP+PE/PP+PE or PP+PE/PE/PE or PP+PE/PP/PE or PP+PE/PE/PP membrane or membranes to form the following constructions, PP or PE or PE+PP or PP/PE or PP/PP or PE/PE or PP+PE/PP or PP+PE/PP+PE or PP+PE/PE or [PP/PE/PP]/[PP/PP/PP] or [PP/PE/PP]/[PE/PE/PE] or [PP/PP/PP]/[PE/PE/PE] or [PP/PE/PP]/[PP/PE/PP] or [PE/PE/PE]/[PE/PE/PE] or [PE/PE/PE]/[PP/PP/PP] or [PP/PP/PP]/[PP/PP/PP] or [PP/PP/PP]/[PP/PP/PP]/[PP/PP/PP] or [PE/PE/PE]/[PE/PE/PE]/[PP/PP/PP] or [PP/PP/PP]/[PP/PP/PP]/[PE/PE/PE] or [PP/PE/PE]/[PE/PE/PE] or [PP/PP/PE]/[PE/PE/PE] or [PE/PP/PP]/[PP/PP/PE] or [PP+PE/PP/PP]/[PP/PP/PP+PE] or [PP/PE/PP]/[PP/PP/PP]/[PE/PE/PE] or [PP/PE/PP]/[PE/PE/PE]/[PP/PP/PP] or [PP/PP/PP]/[PE/PE/PE]/[PP/PP/PP] or [PP/PE/PP]/[PP/PE/PP]/[PP/PE/PP] or [PE/PE/PE]/[PE/PE/PE]/[PP/PP/PP]/ [PP/PP/PP]/[PP/PP/PP] or [PE/PE/PE]/[PE/PE/PE]/[PP/PP/PP] or [PP/PP/PP]/[PP/PP/PP]/[PE/PE/PE] or [PP/PE/PE]/[PE/PE/PE]/[PE/PE/PP] [PP/PP/PE]/[PE/PE/PE]/[PE/PP/PP] or [PE/PP/PP]/[PP/PP/PP]/[PP/PP/PE] or [PP+PE/PP/PP]/[PP/PP/PP]/[PP/PP/PP+PE] or [PP/PE/PP]/[PP/PE/PE] or [PE/PP/PE]/[PE/PP/PP] or [PE/PE/PP]/[PP/PE/PE] or [PP+PE/PP/PP]/[PP/PP/PP+PE] or [PP+PE/PP/PP+PE]/ [PP+PE/PP+PE/PP+PE] or [PP+PE/PE/PP+PE]/[PP+PE/PP/PE] or [PP+PE/PE/PE]/[PP+PE/PP/PE]/[PP+PE/PE/PP] or other such combinations or subcombinations of PP, PE, or PP+PE (blends, mixtures, or co-polymers) layers, microlayers, nanolayers, or combinations thereof, or other multi-layer constructions, where each of the individual co-extruded polymer layers are preferably micrometer or nanometer in thickness (microlayers or nanolayers).

Although it may be preferred that each of the layers or microlayers or nanolayers be polyolefin (PO) such as PP or PE or PE+PP blends, mixtures, co-polymers, or the like, it is contemplated that other polymers (PY), additives, agents, materials, fillers, and/or particles (M), and/or the like may be added or used and may form layers, microlayers, nanolayers, or membranes such as PP+PY, PE+PY, PP+M, PE+M, PP+PE+PY, PE+PP+M, PP+PY+M, PE+PY+M, PP+PE+PY+M, or blends, mixtures, co-polymers, and/or the like thereof, and that such layers or membranes may be used in combination with one or more PP or PE or PE+PP layers or membranes.

Also, identical, similar, distinct, or different PP or PE or PE+PP polymers, homopolymers, copolymers, molecular weights, blends, mixtures, co-polymers, or the like layers, microlayers, nanolayers, or membranes, may be used in many different combinations and subcombinations to form layers, sub-layers, membranes, or sub-membranes. For example, identical, similar, distinct, or different molecular weight PP, PE, and/or PP+PE polymers, homopolymers, co-polymers, multi-polymers, blends, mixtures, and/or the like may be used in each layer or membrane or in each individual layer, microlayer, nanolayer, or membrane. As such, constructions may include various combinations and subcombinations of PP, PE, PP+PE, PP1, PP2, PP3, PE1, PE2, PE3, PP1+PP2, PE1+PE2, PP1+PP2+PP3, PE1+PE2+PE3, PP1+PP2+PE, PP+PE1+PE2, PP1/PP2, PP1/PP2/PP1, PE1/PE2, PE1/PE2/PP1, PE1/PE2/PE3, PP1+PE/PP2, or other combinations or constructions. For example, inventive membrane or separator properties can be improved, modified or optimized by, for example, adjusting the outer layer or membrane surface by using a particular polymer, blend, molecular weight polymer, and/or the like in just the outer layer or membrane surface. As a non-limiting example, an outer PE or PP+PE surface or layer may have improved pin removal (lower COF), a higher molecular weight (MW) polymer surface or layer (PP or PE) may have improved puncture strength, a PP or PP+PE surface or layer may have improved oxidation resistance, expensive raw materials (expensive polymers) can be used in limited layers to reduce cost, and/or the like. Further, although it may be preferred that each of the layers or microlayers or nanolayers be polyolefin (PO) such as PP or PE or PE+PP blends, mixtures, co-polymers, or the like, it is contemplated that other polymers (PY), additives, agents, materials, fillers, and/or particles (M), and/or the like may be added or used and may form layers, microlayers, nanolayers, or membranes such as different outer or surface layers that may be used in combination with one or more PP or PE or PE+PP layers or membranes, and that coatings (CT) or nonwovens (NW) may be added.

The production of monolayer or multi-layer porous, microporous or nanoporous membranes according to various inventive embodiments herein, may allow for improved characteristics such as improved shutdown, mechanical strength, porosity, permeability, oxidation resistance, pin removal, wettability, and/or splittiness (reduced splitting), and the like.

In one embodiment of the invention, a multi-layer membrane may be extruded in the form of a PE homopolymer/PE homopolymer, or PP homopolymer/PP homopolymer, or one or more layers of such a multi-layer membrane may include a blend of two polymers, such as a blend of PEs/homopolymer PE, and so forth.

The microlayer membrane precursors may be bonded together via lamination or adhesion. The possibly preferred battery separators described herein may exhibit a total thickness of less than about 30 µm, less than about 25 µm, less than about 20 µm, less than about 16 µm, less than about 15 µm, less than about 14 µm, or less than about 10 µm, less than about 9 µm, less than about 8 µm, or less than about 6 µm (depending on the number of layers) and may surprisingly exhibit increased strength performance, as defined by reduced splittiness or reduced propensity to split, when compared to known battery separators of the same (or greater) thickness, especially when compared to known dry process battery separators of the same (or greater) thickness. The improvement in splitting or splittiness may be quantified by a test method disclosed herein as Composite Splittiness Index (CSI) and the novel or improved separators described herein may have an improvement in the CSI, and also may exhibit improved Gurley as well as other improvements, such as improved puncture strength and so forth.

In at least one embodiment the inventive membrane may be constructed of many microlayers or nanolayers wherein the final product may contain 50 or more layers of individual microlayers or nanolayers. In at least certain embodiments the microlayer or nanolayer technology may be created by in a pre-encapsulation feedblock prior to entering a cast film or blown film die.

In at least selected embodiments the microlayer or nanolayer membrane may contain 3 or more layers of individual coextruded microlayers or nanolayers and may have improved strength, improved cycling, greater tortuosity, and favorable compression resistance and/or recovery.

In at least selected embodiments the microlayer or nanolayer membrane may contain 3 or more layers of individual coextruded microlayers or nanolayers and may have improved strength, improved cycling, greater tortuosity, and/or favorable compression resistance and/or recovery.

In at least selected embodiments the microlayer or nanolayer membrane may contain 9 or more layers of individual coextruded microlayers or nanolayers and may have improved strength, improved cycling, greater tortuosity, and/or favorable compression resistance and/or recovery.

In at least selected embodiments the microlayer or nanolayer membrane may contain 5 or more layers of individual coextruded microlayers or nanolayers and may have improved strength, improved cycling, greater tortuosity, and/or favorable compression resistance and/or recovery.

In at least certain selected embodiments the microlayer membrane may contain 3 or more layers of individual coextruded microlayers and may have improved strength, improved cycling, greater tortuosity, and/or favorable compression resistance and/or recovery.

In at least certain selected particular embodiments the multi-layer membrane may contain 2 or more layers of individual coextruded microlayers that are laminated together and may have improved strength, improved cycling, greater tortuosity, and/or favorable compression resistance and/or recovery.

In at least certain selected particular embodiments the multi-layer membrane may contain 3 or more layers of individual coextruded microlayers that are laminated together and may have improved strength, improved cycling, greater tortuosity, and/or favorable compression resistance and/or recovery.

DETAILED DESCRIPTION OF THE INVENTION

In accordance with at least selected embodiments, aspects or objects, the present application or invention may address the above needs or issues, and/or may provide novel or improved membrane layers, porous membranes or substrates, separator membranes, separators, composites, electrochemical devices, batteries, methods of making such membranes or substrates, separators, and/or batteries, and/or methods of using such membranes or substrates, separators and/or batteries. In accordance with at least certain embodiments the instant battery separator comprises a one or more co-extruded micro-layer or microlayer membranes laminated or adhered to another polymer membrane. For example, in some instances, the battery separator may comprise, but is not limited to, a polyethylene/polyethylene/polyethylene (PE/PE/PE) coextruded micro-trilayer membrane laminated to a polypropylene (PP) monolayer micro or nanolayer membrane, and, in some embodiments, further laminated to another PE/PE/PE coextruded micro-trilayer membrane, to form the following construction: [PE/PE/PE]/PP/[PE/PE/PE]. In selected embodiments, the membrane, membrane precursor, sub-membrane, layer, or sub-layer may be comprised of one or more microlayers. A microlayer is defined herein as a layer or individual layer, for example, of polymer or co-polymer blend, that is preferably less than about 5 µm thick, more preferably less than about 4 µm, still more preferably less than about 3 µm, and possibly most preferably less than about 2 µm. In selected embodiments, the membrane, membrane precursor, sub-membrane, layer, or sub-layer may be comprised of one or more nanolayers. A nanolayer is defined herein as a layer or individual layer, for example, of polymer or co-polymer blend, that is less than about 1 µm thick, more preferably less than about 0.5 µm, still more preferably less than about 0.3 µm, and possibly most preferably less than about 0.2 µm.

Figure 1:
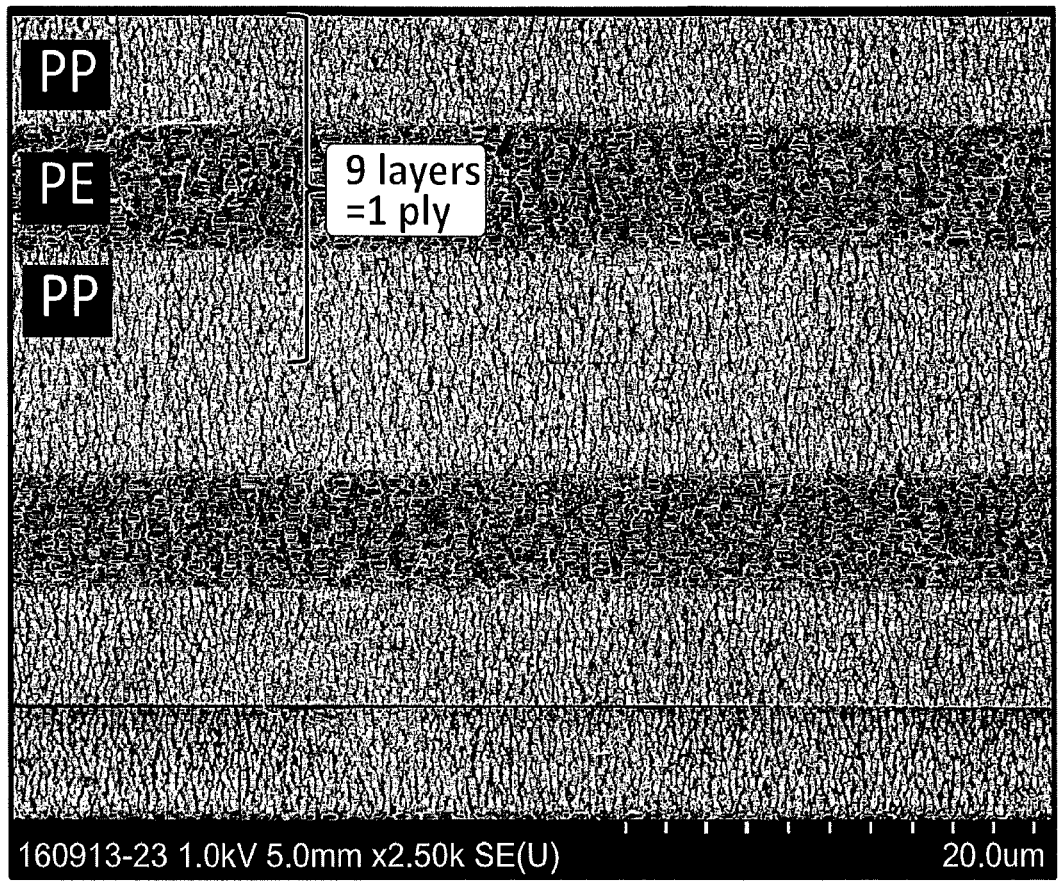
FIG. 1 is a partial cross-section Scanning Electron Micrograph (SEM) of an exemplary inventive laminated 3 layer or triple trilayer microporous membrane trilayer/trilayer/trilayer (with 9 coextruded microlayers per each trilayer layer, and with 3 microlayers per each PP or PE sub-layer of each trilayer layer) at a magnification of 2,500× (at least the outer PP layers of each layer are microporous).
Figure 2:
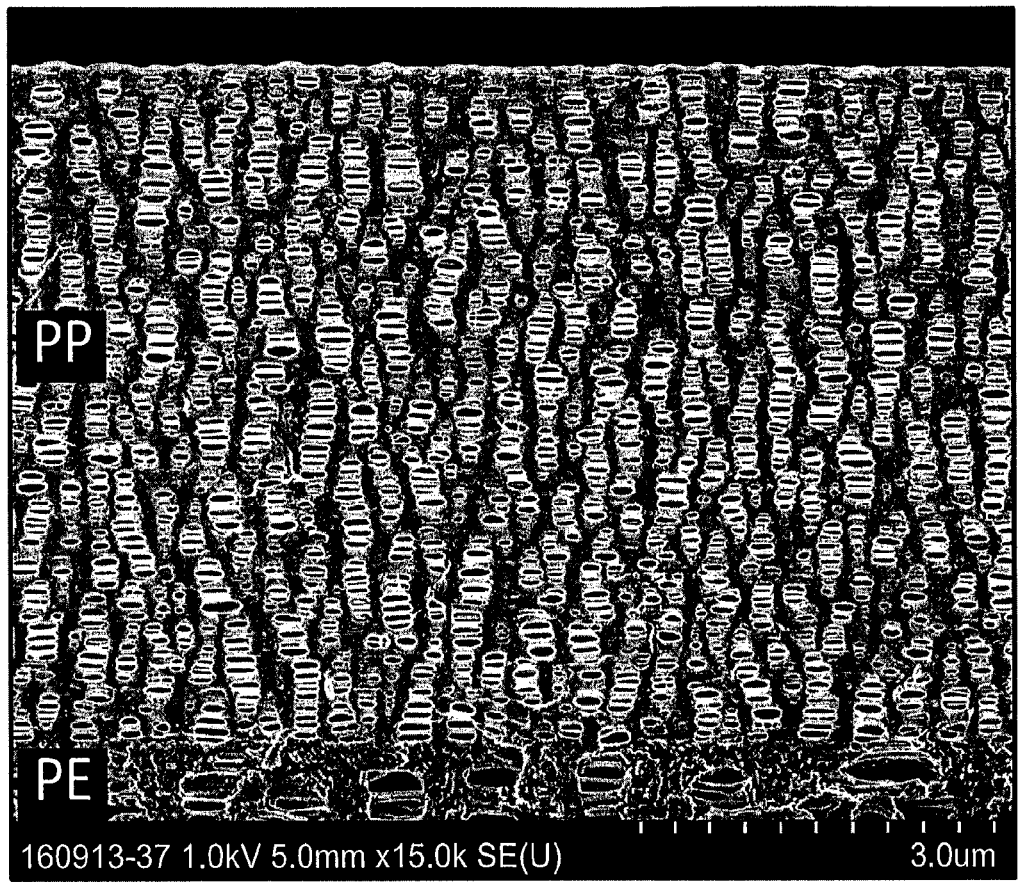
FIG. 2 is a partial cross-section Scanning Electron Micrograph (SEM) of a portion of the polypropylene surface sub-layer (3 microlayers of PP) of the surface trilayer component or sub-membrane of the composite laminated membrane of FIG. 1 at a magnification of 15,000× (the PP.
Figure 3:
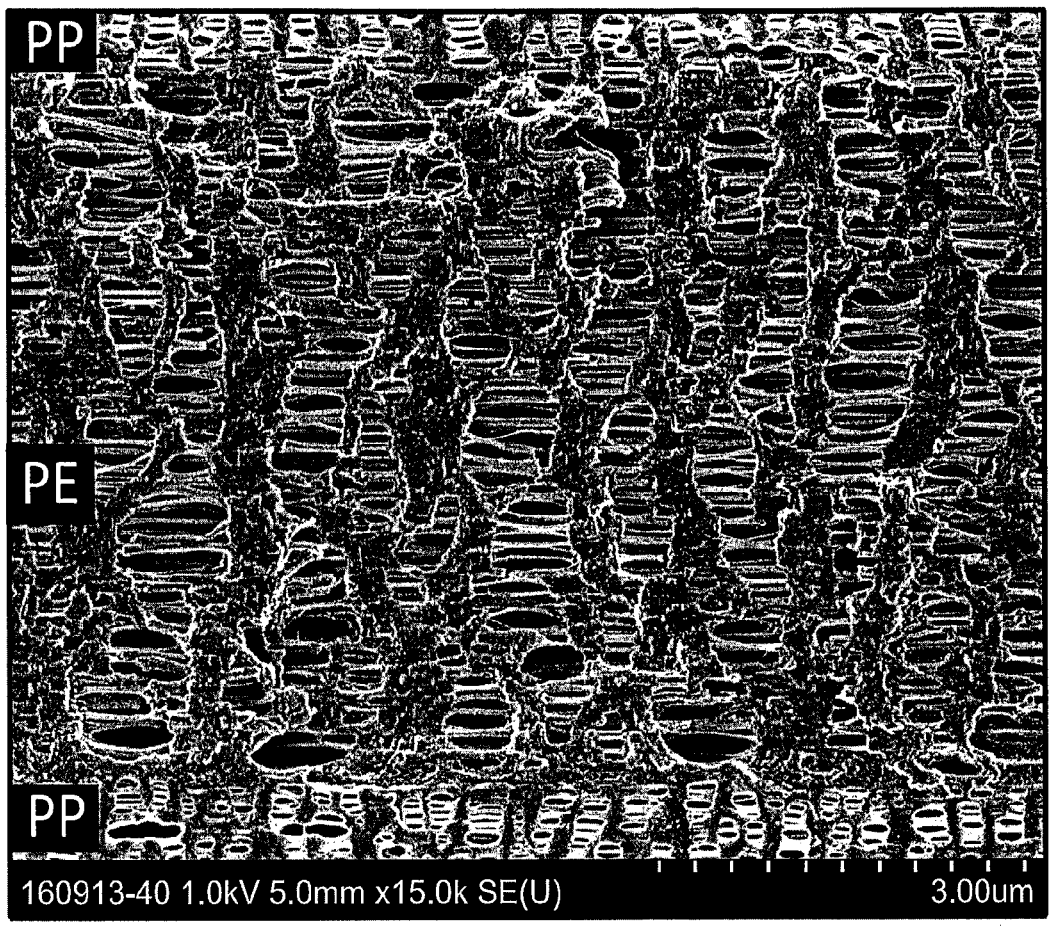
FIG. 3 is a partial cross-section Scanning Electron Micrograph (SEM) of the polyethylene sub-layer (3 microlayers of PE) of one of the 9 microlayer trilayer layers of the 3 layer membrane of FIG. 1 at a magnification of 15,000×.

A novel microporous battery separator has been developed for use in a lithium ion rechargeable battery. The possibly preferred inventive separator membrane, separator, base film, or membrane may, in some embodiments, comprise a polyethylene/polyethylene/polyethylene (PE/PE/PE) coextruded microlayer (PE micro-trilayer) membrane laminated to another membrane, such as a polypropylene (PP) monolayer membrane, and in some instances, further laminated to another PE/PE/PE coextruded microlayer membrane to form the following construction: [PE/PE/PE]/PP/[PE/PE/PE]. Possibly preferred separator, membrane or base film thickness may range from 5 um to 30 um. FIG. 1 demonstrates the 9 microlayer coextruded construction of each of the 3 layers of the membrane (the 3 layers are laminated together to form the membrane). In each of the polymer sub-layers of the 9 microlayer layers, there are three microlayers that create the PP or PE sub-layer. FIGS. 2 and 3 show magnified views of the three microlayers highlighting the continuity between each of the microlayers of each layer. FIG. 3 shows the continuity between the polypropylene and polyethylene microlayers. The microlayers of at least each 9 microlayer coextruded layer in FIGS. 1-3 have undefined adjacent microlayer interfaces, this seamless interfacing between microlayers may contribute to improved cycling, increased surface area, and higher tortuosity.

EXAMPLES

In the Examples, various membranes were made having the construction of [PE/PE/PE]/PP/[PE/PE/PE]. Their characteristics are shown in Table 1, just below:

The various membranes Ex 1, Ex 2, and Ex 3 made as inventive Examples demonstrate (as shown in Table 1 below) improved puncture strength and an improvement in dielectric breakdown (DB) over the control CE 1.

TABLE 1

| | Example Number | | | |
|---|---|---|---|---|
| | CE 1 | Ex 1 | Ex 2 | Ex 3 |
| Thickness (microns) | 14 | 14 | 14.4 | 14.5 |
| JIS Gurley (seconds) | 220 | 291 | 306 | 309 |
| Puncture Strength Average (g) | 265 | 323 | 294 | 291 |
| MD Tensile Stress (kgf/cm$^2$) | 2500 | 2867 | 2668 | 2802 |
| TD Tensile Stress (kgf/cm$^2$) | 125 | 118 | 132 | 128 |
| TD elongation average (%) | 980 | 978 | 751 | 854 |
| Shrinkage at 105° C. (%) | 1.7 | 2.5 | 4.4 | 4.2 |
| Calculated Porosity | 40% | 42% | 40% | 37% |
| Outside Layer/Middle layer Pore size | 0.054/ 0.028 | 0.045/ 0.028 | 0.041/ 0.027 | 0.042/ .027 |
| MixP (Relative to control) | −46% | −52% | −47% | −48% |
| Dielectric Breakdown Average (volts) | 1510 | 1720 | 1835 | 1649 |

In accordance with at least certain embodiments, the present invention is directed to a multi-layered battery separator or separator membrane whose exterior surface comprises multiple layers that in some instances have been co-extruded, for example, a co-extruded multi-layer membrane of polyethylene (PE) homopolymer, which is adhered or laminated to a polypropylene monolayer and an additional multi-layered coextruded multi-layer membrane comprising polyethylene homopolymer.

In accordance with at least certain embodiments, the present invention is directed to a multi-layered battery separator or separator membrane whose exterior surface Also, performance can be further improved, optimized, selected, controlled, or the like.

In accordance with at least certain embodiments, the present invention is directed to a multi-layered battery separator or separator membrane whose exterior surface comprises multiple layers that in some instances have been co-extruded, for example, a co-extruded multi-layer membrane of polyethylene (PE) homopolymer, which is adhered or laminated to a polypropylene monolayer and an additional multi-layered coextruded multi-layer membrane comprising polyethylene homopolymer.

In accordance with at least certain embodiments, the present invention is directed to a multi-layered battery separator or separator membrane whose exterior surface comprises multiple layers and one or more of which layers includes a polyethylene (PE) blend and/or a PE copolymer, which is adhered or laminated to a polypropylene monolayer and an additional multi-layered coextruded multi-layer membrane, one or more of which layers includes a polyethylene blend and/or a PE copolymer.

In accordance with at least certain embodiments, the present invention is directed to a multi-layered battery separator or separator membrane whose exterior surface comprises multiple layers and one or more layers of which includes a polyethylene (PE) homopolymer while one or more layers of which includes a polyethylene blend and/or a PE copolymer, which is adhered or laminated to a polypropylene monolayer and an additional multi-layered coextruded membrane, one or more layers of which includes a polyethylene (PE) homopolymer while one or more layers of which includes a polyethylene blend and/or a copolymer blend. Other possibilities for such constructions are also included in this invention in which at least one co-extruded multi-layer membrane is laminated to at least one other membrane to form a multi-layer construction that combines aspects of co-extruded membranes with aspects of laminated membranes.

Multi-layered polyolefin membranes are designed to provide an exterior surface that has a low pin removal force, faster wetting, good coating adhesion, tunable shutdown and the like. Each layer of polymer is laminated or co-extruded with the resulting membrane having significant improvements in many characteristics. The invention herein described utilizes both the co-extrusion and lamination of one or more multi-layer membranes to improve surface characteristics. In accordance with at least certain embodiments the present invention may provide an exterior surface that has improved shutdown function, improved longitudinal strength, and an increase in dielectric breakdown.

The polymers or co-polymers that may be used in the instant battery separator are those that are extrudable. Such polymers are typically referred to as thermoplastic polymers. Exemplary thermoplastic polymers, blends, mixtures or copolymers may include, but are not limited to: polyolefins, polyacetals (or polyoxymethylenes), polyamides, polyesters, polysulfides, polyvinyl alcohols, polyvinyl esters, and polyvinylidenes (and may include PVDF, PVDF:HFP, PTFE, PEO, PVA, PAN, or the like). Polyolefins include, but are not limited to: polyethylene (including, for example, LDPE, LLDPE, HDPE, UHDPE, UHMWPE, and so forth), polypropylene, polybutylene, polymethylpentene, copolymers thereof, and blends thereof. Polyamides (nylons) include, but are not limited to: polyamide 6, polyamide 66, Nylon 10, 10, polyphthalamide (PPA), co-polymers thereof, and blends thereof. Polyesters include, but are not limited to: polyester terephthalate, polybutyl terephthalate, copolymers thereof, and blends thereof. Polysulfides include, but are not limited to, polyphenyl sulfide, copolymers thereof, and blends thereof. Polyvinyl alcohols include, but are not limited to: ethylene-vinyl alcohol, copolymers thereof, and blends thereof. Polyvinyl esters include, but are not limited to, polyvinyl acetate, ethylene vinyl acetate, copolymers thereof, and blends thereof. Polyvinylidenes include, but are not limited to: fluorinated polyvinylidenes (e.g., polyvinylidene chloride, polyvinylidene fluoride), copolymers thereof, and blends thereof. Various materials may be added to the polymers. These materials are added to modify or enhance the performance or properties of an individual layer or the overall separator. Such materials include, but are not limited to: Materials to lower the melting temperature of the polymer may be added. Typically, the multi-layered separator includes a layer designed to close its pores at a predetermined temperature to block the flow of ions between the electrodes of the battery. This function is commonly referred to as shutdown.

Figure 4:
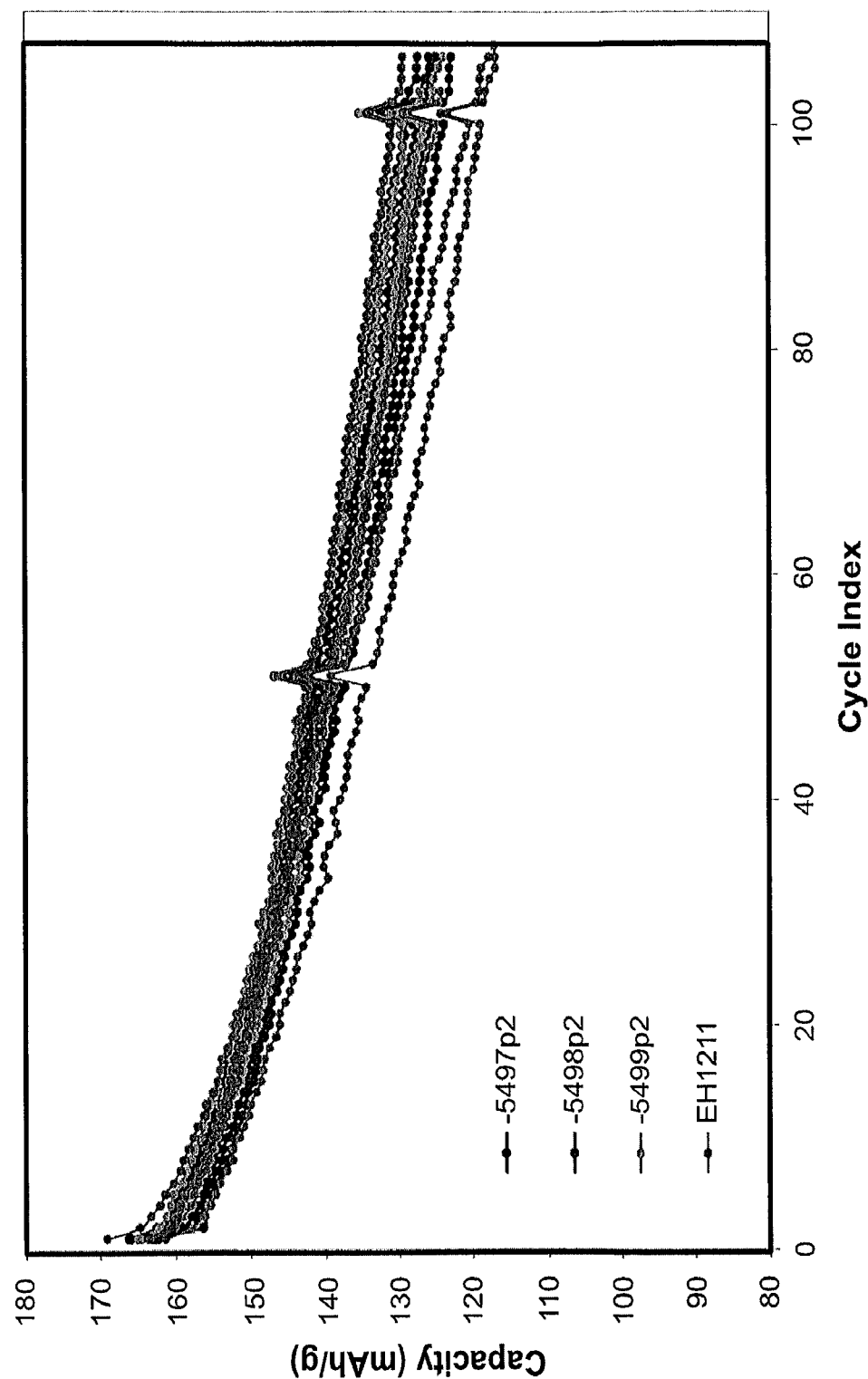
FIG. 4 is a graph demonstrating the improved cycling behavior of exemplary inventive constructions as compared to EH1211.

FIG. 4 shows the cycling performance of the microlayer membranes as compared to EH1211. In each sample, the microlayer construction showed maintained or improved cycling performance.

In at least selected embodiments, the microlayers or nanolayers may include various additives in one or more layers for example, to reduce pin removal force while not affecting the adhesion between PP and PE in, for example, micro-trilayer applications. In certain instances the additives may be applied to the outside microlayers. The outer microlayers may comprise or consist of PP with Siloxane additives/homopolymer PP/homopolymer PP. The additives can include all that could affect the surface characteristics of the film, some examples include: PE, Calcium Stearate, Lithium Stearate, and/or Siloxane.

In accordance with at least selected embodiments, aspects or objects, the present application or invention may be directed to: a battery separator or separator membrane that comprises one or more co-extruded multi-layer membranes laminated or adhered to another polymer membrane and/or to another co-extruded multi-layer membrane, and/or such separators that may provide improved strength, for example, improved puncture strength, particularly at a certain thickness, and/or may exhibit improved shutdown and/or a reduced propensity to split.

In accordance with at least certain embodiments, aspects or objects, the present application or invention may be directed to: a battery separator or separator membrane that comprises one or more co-extruded multi-layer microlayer and/or nanolayer membranes, and/or such separators that may provide improved strength, for example, improved puncture strength, particularly at a certain thickness, and/or may exhibit improved shutdown and/or a reduced propensity to split.

In accordance with at least certain embodiments, aspects or objects, the present application or invention may be directed to: a battery separator or separator membrane that comprises one or more co-extruded multi-layer microlayer and/or nanolayer membranes co-extruded, laminated or adhered to another polymer membrane and/or to another co-extruded multi-layer membrane, and/or such separators that may provide improved strength, for example, improved puncture strength, particularly at a certain thickness, and/or may exhibit improved shutdown and/or a reduced propensity to split.

Figure 6:
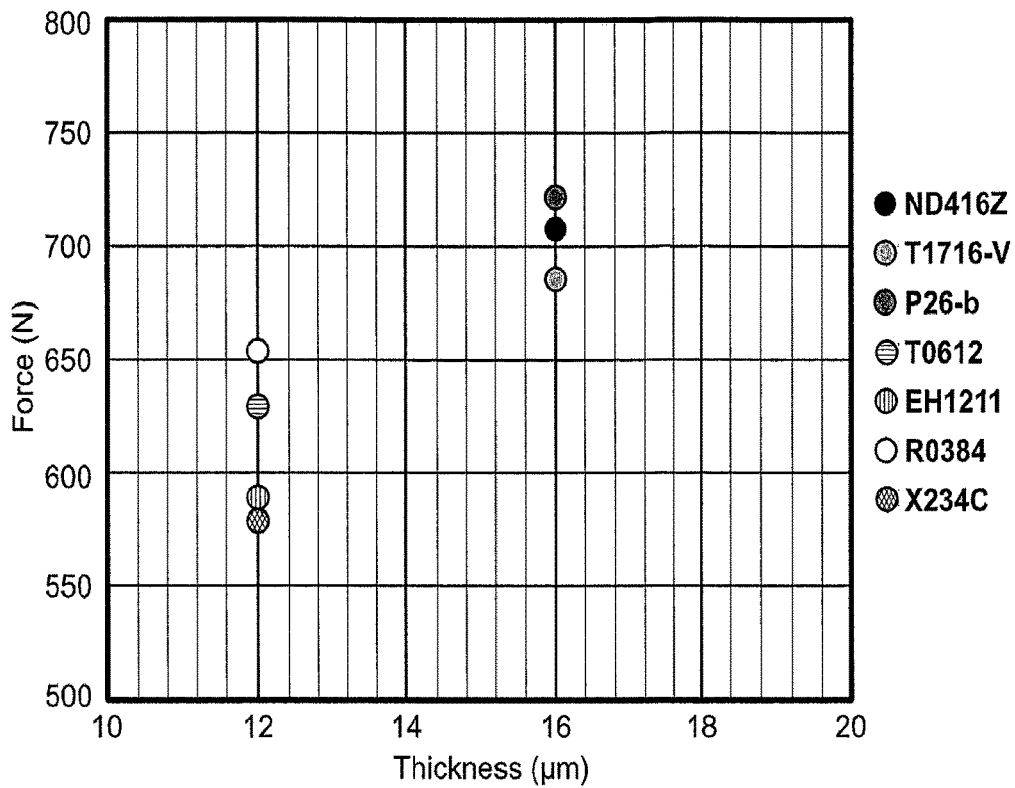
FIG. 6 is a graph demonstrating Mix P penetration test results of certain constructions as compared to EH1211.

Table 2 shows a comparison of the 9 microlayer, 12 µm, membrane with a more conventional structure 12 µm trialyer membrane (EH1211). When compared to the conventional trilayer, the inventive microlayer 12 µm membrane exhibited increased mechanical strength and a significant reduction in shrinkage. FIG. 6 shows Mix P or mix penetration test results for the 9 microlayer 12 µm microporous membrane. The inventive microlayer membrane exhibited the greatest resistance to penetration at 650 N force.

TABLE 2

| Product | EH1211 | 9-microlayer construction |
|---|---|---|
| Thickness (um) | 12 | 12 |
| JIS Gurley | 225 | 234 |
| Puncture Strength Average | 277 | 318 |
| MD Tensile Stress (kgf/cm$^2$) | 2231 | 2393 |
| TD Tensile Stress (kgf/cm$^2$) | 138 | 139 |
| MD elongation (%) | 48 | 51 |
| TD elongation (%) | 704 | 756 |
| QC Porosity | 42% | — |
| MD Shrinkage @ 105° C. (%) | 3.7 | 1.0 |

Table 3 shows comparison of the 9 microlayer 12 µm membrane (R0384) to a more conventional 12 µm dry process membrane (EH1211). The microlayer construction provides greater compression recovery than the comparable wet process membrane. In certain applications, less crush and/or better compression recovery may be desired.

TABLE 3

| Sample | EH1211 | R0384 |
|---|---|---|
| Thickness (µm) | 12 | 12 |
| Mix-P (N) | 588 | 653 |
| Compression Recovery (%) | 3.81 | 4.47 |
| Max Compression (%) | 13.82 | 15.20 |
| Final Compression (%) | 10.01 | 10.73 |

Figure 5:
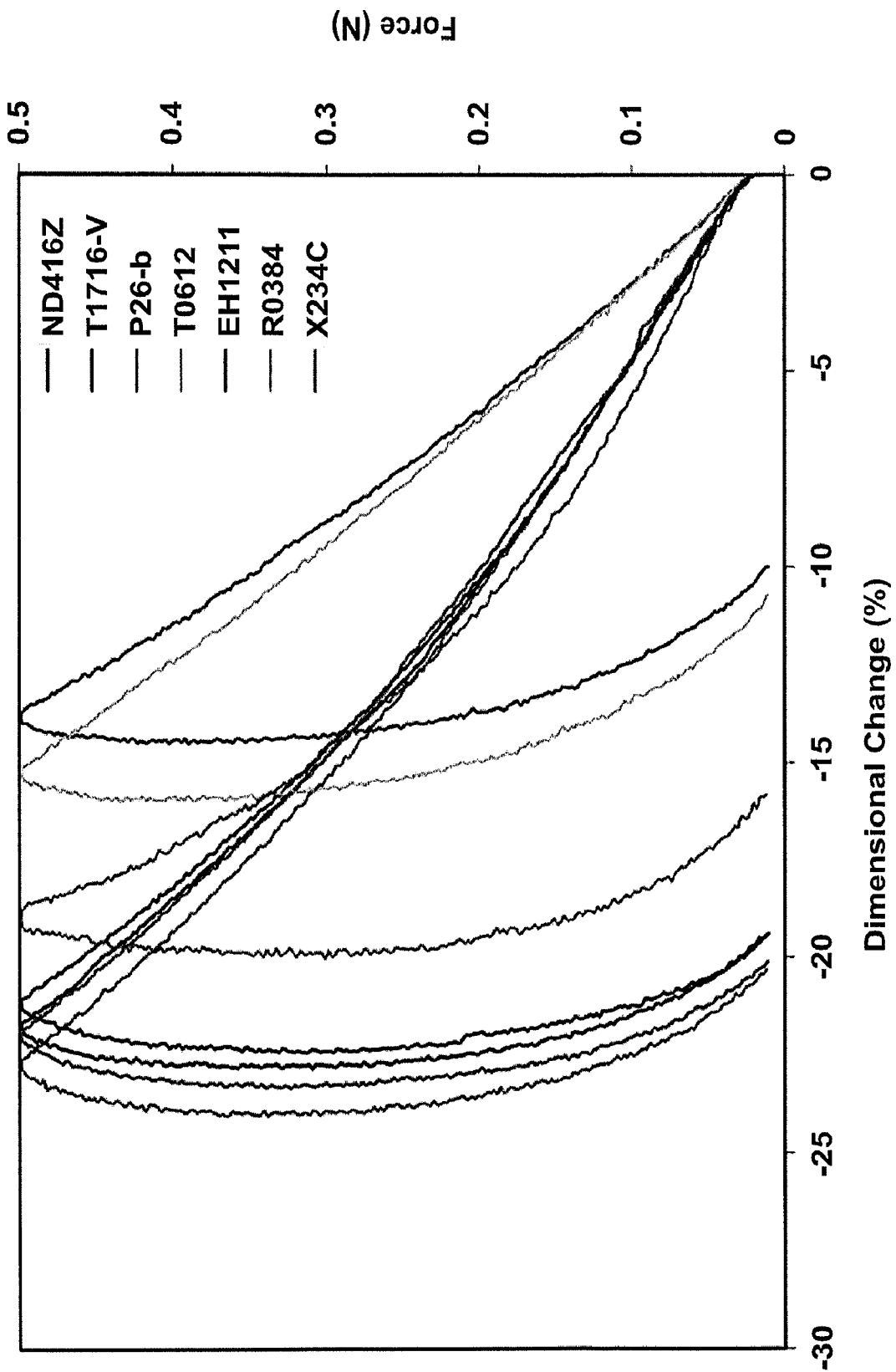
FIG. 5 is a graph demonstrating compression elasticity results of certain constructions as compared to EH1211.
Figure 7:
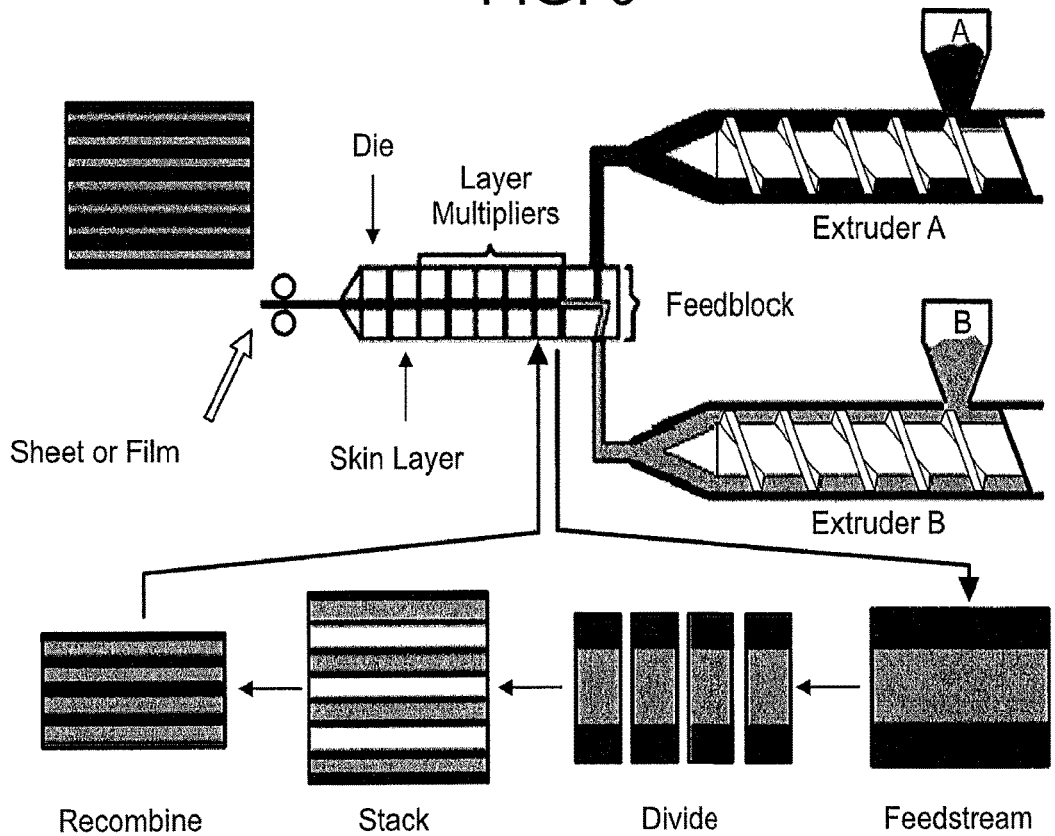
FIG. 7 is a schematic diagram of how microlayers may be created in the feedblock by layer multiplication.
Figure 8:
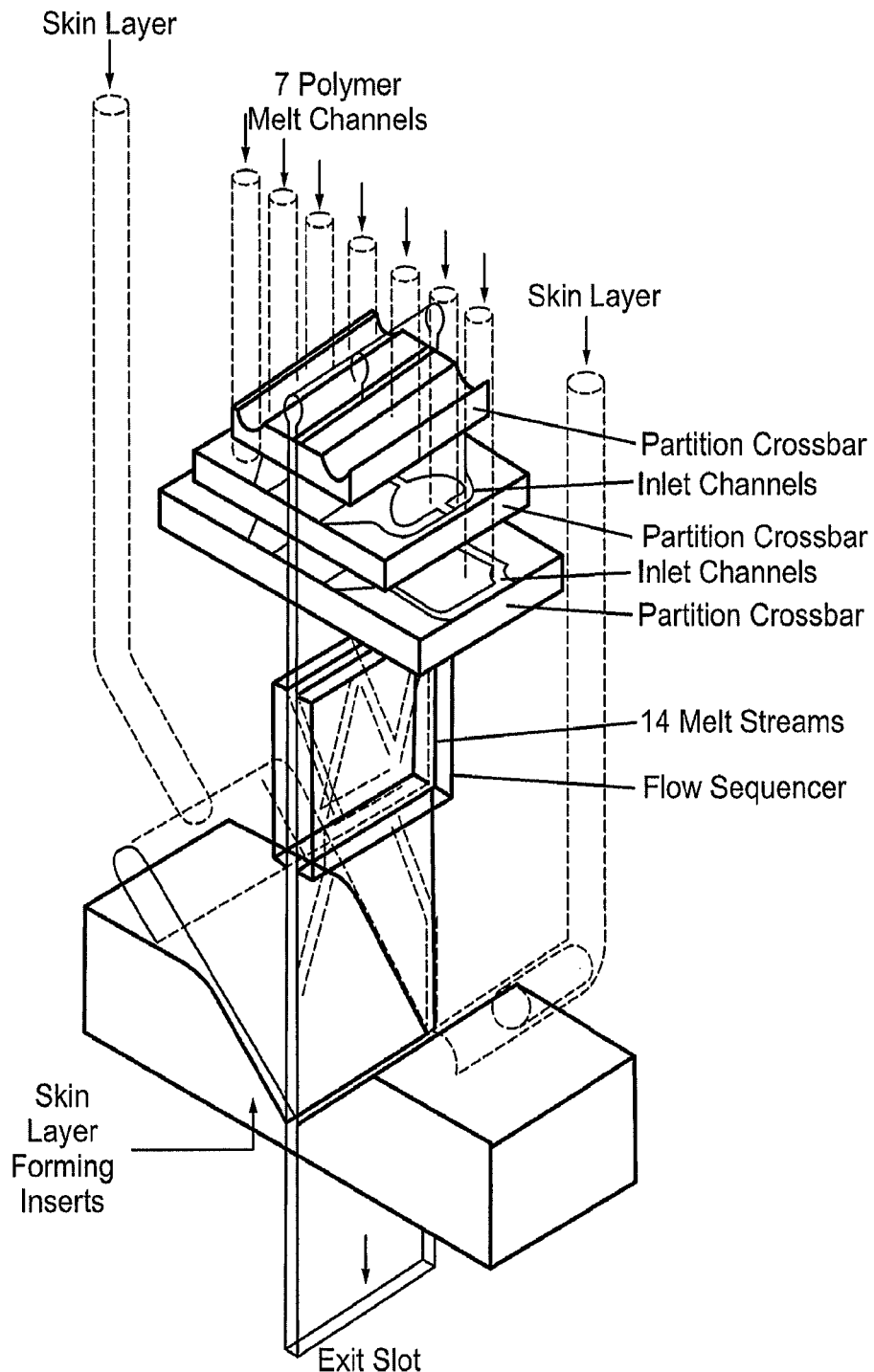
FIG. 8 is a schematic diagram of how microlayers may be created by layer splitting.
Figure 9:
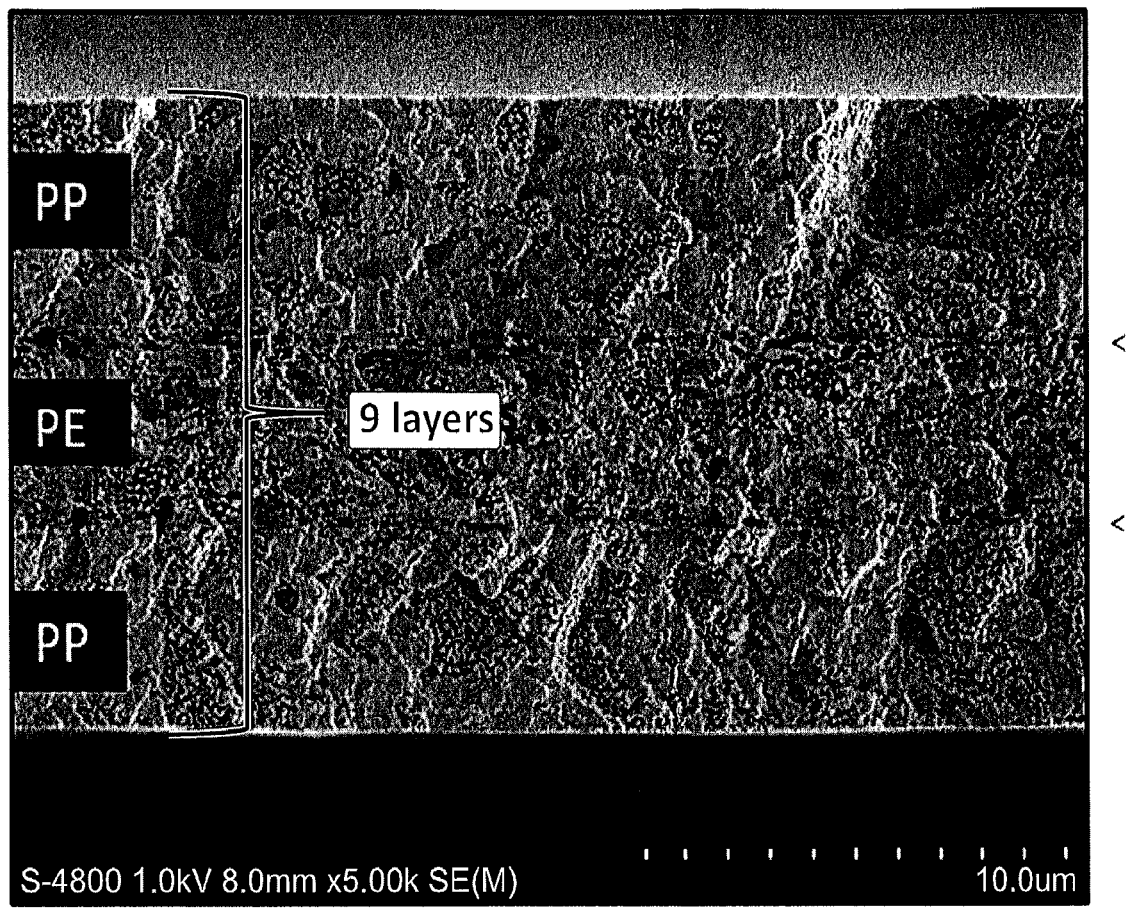
FIG. 9 is a cross-section Scanning Electron Micrograph (SEM) of an exemplary inventive 3 layer or trilayer (9 microlayers total, with 3 triple microlayer sub-layers laminated together) PP/PE/PP microporous membrane at a magnification of 5,000× (at least the outer PP sub-layers are microporous).
Figure 10:
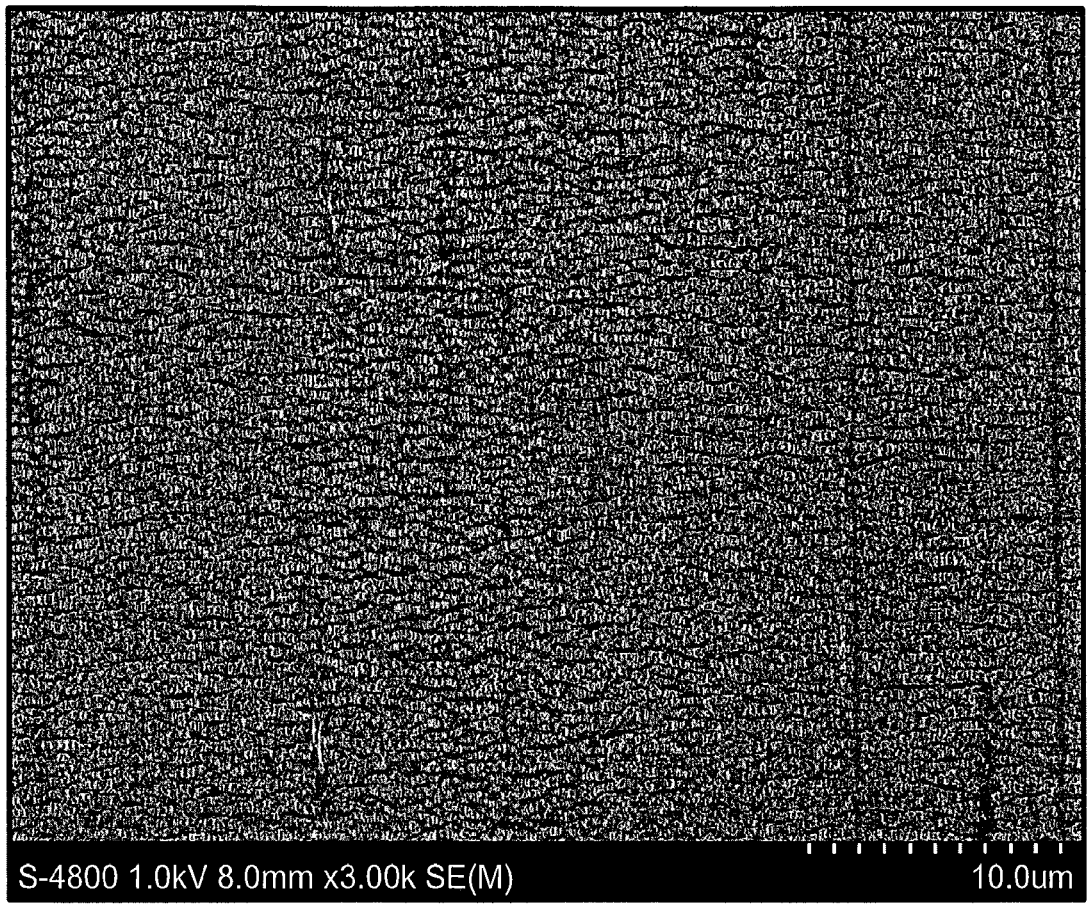
FIG. 10 is a surface Scanning Electron Micrograph (SEM) of a surface of the polypropylene surface sub-layer (surface PP microlayer) of the 9 microlayer, 3 layer membrane of FIG. 9 at a magnification of 3,000×. This 9 microlayer membrane could be used as one layer of a 3 layer membrane such as shown in FIG. 1.
Figure 11:
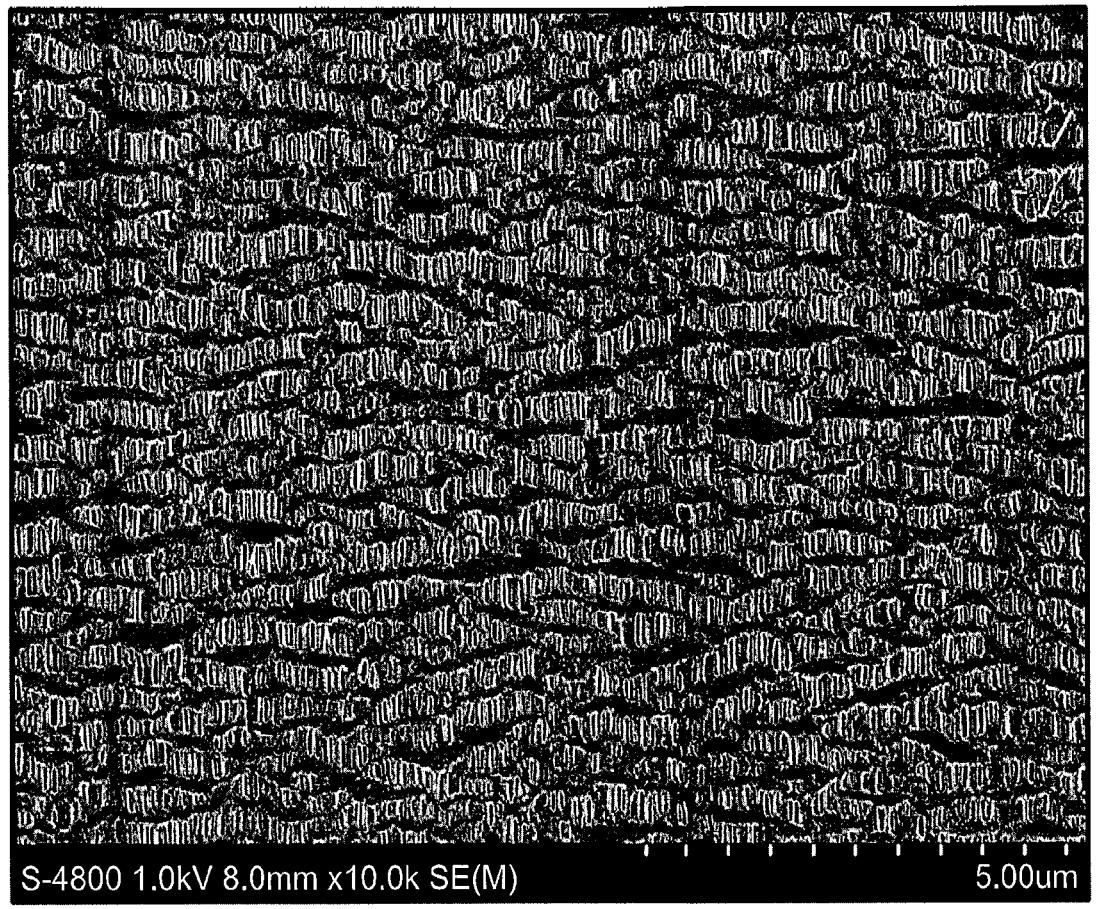
FIG. 11 is a surface Scanning Electron Micrograph (SEM) of a portion of the surface of the polypropylene surface sub-layer (surface PP microlayer) of the 9 microlayer layer, 3 layer membrane of FIG. 9 at a magnification of 10,000×.
Figure 12:
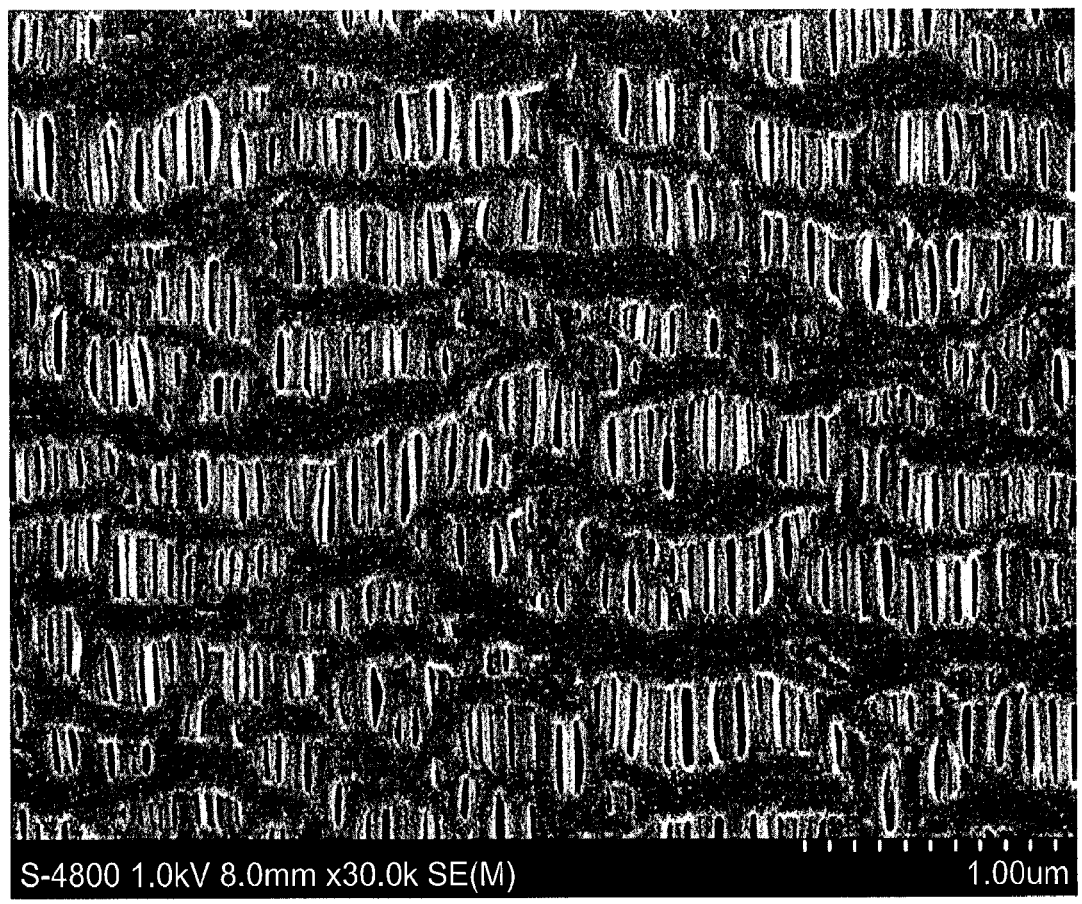
FIG. 12 is a surface Scanning Electron Micrograph (SEM) of a portion of the surface of the polypropylene surface sub-layer (surface PP microlayer) of the 9 microlayer, 3 layer membrane of FIG. 9 at a magnification of 30,000×.

FIG. 5 and Table 3 shows the compression profile for various porous membranes. When compared to other 12 µm membranes the microlayer construction shows a balanced compression recovery profile, while it can be compressed it does offer some recovery which may be critical in certain particular battery applications. In at selected embodiments, the instant microlayer or nanolayer technology may be comprised of greater than 50 layers. These layers may be created in a pre-encapsulation feedblock first before entering either a cast-film die or a blown film die. The microlayers may be created in the feedblock by layer multiplication (one example in FIG. 7) or layer splitting (one example in FIG. 8). When used in making porous membrane precursors, these techniques may further improve strength and flex-crack resistance. These precursors would be laminated, annealed, and stretched, and the resulting membrane may exhibit improved strength and toughness. Furthermore, by leveraging these techniques it may alleviate the need to use polymers with molecular weights greater than 1M whose processing can be very difficult, especially in dry process membranes.

In other selected particular embodiments, microlayers may be used to create a modified trilayer membrane. In this embodiment, the microlayers would comprise or consist of alternating polymers, and the resulting membrane would be: PP/PE/PP/PE/PP/PE/PP/PE/PP. The precursor membranes may be extruded with microlayers of PP/PE/PP and PE/PP/PE, these microlayer precursors may subsequently be laminated together and then stretched to achieve the desired porosity. The polypropylene may be any homopolymer PP, copolymer PP and/or polymer blends. The polyethylene utilized may be High Density Polyethylene (HDPE) or any polyethylene with comonomers, copolymers and/or polymer blends.

TABLE 4

Additional inventive examples:

| Product Number | Stretch Lot # | Ply No. | PP Pore Size (μm) | PE Pore Size (μm) | Porosity (%) | Surface Area (m²/g) |
|---|---|---|---|---|---|---|
| R0367 | C3306986 | na | 0.0354 | na | 39.59 | 88.29 |
|  | C3306987 | na | 0.0369 | na | 38.70 | 81.41 |
| R0374 | C3338198 | 2 | 0.0299 | 0.0646 | 37.66 | 86.76 |
|  | C3338198 | 5 | 0.0306 | 0.0675 | 37.80 | 85.75 |
|  | C3338199 | 2 | 0.0295 | 0.0643 | 36.83 | 84.73 |
|  | C3338199 | 5 | 0.0302 | 0.0666 | 37.11 | 84.45 |
|  | C3338200 | 2 | 0.0309 | 0.0692 | 38.19 | 85.31 |
|  | C3338200 | 5 | 0.0303 | 0.0676 | 38.34 | 87.23 |
| R0384 | C3435497 | 2 | 0.0402 | 0.0533 | 39.98 | 76.84 |
|  | C3435497 | 5 | 0.0415 | 0.0552 | 40.18 | 74.33 |
|  | C3435498 | 2 | 0.0390 | 0.0514 | 38.80 | 74.65 |
|  | C3435498 | 5 | 0.0399 | 0.0521 | 39.03 | 73.78 |
|  | C3435499 | 2 | 0.0378 | 0.0507 | 38.93 | 76.37 |
|  | C3435499 | 5 | 0.0376 | 0.0515 | 39.11 | 77.33 |

Also, certain inventive microlayer or nanolayer constructions may yield greater surface area.

The FIG. 1-3 cross-sectional SEMs may show columns, pillars, columnar, columnal, columned, or columnated substantially vertical crystalline polymer structures. These columns or pillars of crystalline polymer may enhance strength, improve DB, and/or the like.

In accordance with at least selected embodiments, aspects or objects, the present application or invention may address the above needs or issues and/or may provide novel or improved membrane layers, membranes or separator membranes, battery separators including such membranes, and/or related methods. In accordance with at least selected embodiments, the disclosure or invention relates to novel or improved porous membranes or separator membranes, battery separators including such membranes, and/or related methods. In accordance with at least certain embodiments, the disclosure or invention relates to novel or improved microporous membranes or separator membranes, microlayer membranes, multi-layer membranes including one or more microlayer membranes, battery separators including such membranes, and/or related methods. In accordance with at least certain selected embodiments, the disclosure or invention relates to novel, optimized or improved microporous membranes or separator membranes having one or more novel or improved exterior layers and/or interior layers, microlayer membranes, multi-layered microporous membranes or separator membranes having exterior layers and interior layers, some of which layers are created by co-extrusion and all of which layers are laminated together to form the novel, optimized or improved membranes or separator membranes. In some embodiments, certain layers comprise a homopolymer, a copolymer, and/or a polymer blend. The invention also relates to methods for making such a membrane, separator membrane, or separator, and/or methods for using such a membrane, separator membrane or separator, for example as a lithium battery separator. In accordance with at least selected embodiments, the present application or invention is directed to novel or improved multi-layered and/or microlayer porous or microporous membranes, separator membranes, separators, composites, electrochemical devices, batteries, methods of making such membranes, separators, composites, devices and/or batteries. In accordance with at least certain selected embodiments, the present invention is directed to a novel or improved separator membranes that are multi-layered, in which one or more layers of the multi-layered structure is produced in a multi-layer or microlayer co-extrusion die with one or more extruders feeding the die (typically one extruder per layer or microlayer). The improved membranes, separator membranes, and/or separators may preferably demonstrate improved shutdown, improved strength, improved dielectric breakdown strength, and/or reduced tendency to split.

The present disclosure or invention may relate to novel or improved membranes or separator membranes, battery separators including such membranes, and/or related methods. In accordance with at least selected embodiments, the disclosure or invention relates to novel or improved porous membranes or separator membranes, battery separators including such membranes, and/or related methods. In accordance with at least certain embodiments, the disclosure or invention relates to novel or improved microporous membranes or separator membranes, microlayer membranes, multi-layer membranes including one or more microlayer membranes, battery separators including such membranes, and/or related methods. In accordance with at least certain selected embodiments, the disclosure or invention relates to novel, optimized or improved microporous membranes or separator membranes having one or more novel or improved exterior layers and/or interior layers, microlayer membranes, multi-layered microporous membranes or separator membranes having exterior layers and interior layers, some of which layers are created by co-extrusion and all of which layers are laminated together to form the novel, optimized or improved membranes or separator membranes. In some embodiments, certain layers comprise a homopolymer, a copolymer, and/or a polymer blend. The invention also relates to methods for making such a membrane, separator membrane, or separator, and/or methods for using such a membrane, separator membrane or separator, for example as a lithium battery separator. In accordance with at least selected embodiments, the present application or invention is directed to novel or improved multi-layered and/or microlayer porous or microporous membranes, separator membranes, separators, composites, electrochemical devices, batteries, methods of making such membranes, separators, composites, devices and/or batteries. In accordance with at least certain selected embodiments, the present invention is directed to a novel or improved separator membranes that are multi-layered, in which one or more layers of the multi-layered structure is produced in a multi-layer or microlayer co-extrusion die with multiple extruders. The improved membranes, separator membranes, or separators may preferably demonstrate improved shutdown, improved strength, improved dielectric breakdown strength, and/or reduced tendency to split.

In accordance with at least selected embodiments, a battery separator or separator membrane comprises one or more co-extruded multi-microlayer membranes optionally laminated or adhered to another polymer membrane. The separators described herein may provide improved strength, for example, improved puncture strength, particularly at a certain thickness, and may exhibit improved shutdown and/or a reduced propensity to split.

Test Methods

Gurley
Gurley is defined herein as the Japanese Industrial Standard (JIS Gurley) and is measured herein using the OHKEN permeability tester. JIS Gurley is defined as the time in seconds required for 100 cc of air to pass through one square inch of film at a constant pressure of 4.9 inches of water.

Thickness
Thickness is measured in micrometers, μm, using the Emveco Microgage 210-A micrometer thickness tester and test procedure ASTM D374.

Tensile Strength
Machine Direction (MD) and Transverse Direction (TD) tensile strength are measured using Instron Model 4201 according to ASTM-882 procedure.

Tensile Strength
% MD elongation at break is the percentage of extension of a test sample along the machine direction of the test sample measured at the maximum tensile strength needed to break a sample.

% TD elongation at break is the percentage of extension of a test sample along the transverse direction of the test sample measured at the maximum tensile strength needed to break a sample.

Puncture Strength
Puncture Strength is measured using Instron Model 4442 based on ASTM D3763. The measurements are made across the width of the microporous membrane and the puncture strength defined as the force required to puncture the test sample.

Thermal Shrinkage
Shrinkage is measured by placing a test sample between two sheets of paper which is then clipped together to hold the sample between the papers and suspended in an oven. For the '105° C. for 1 hour' testing, a sample is placed in an oven at 105° C. for 1 hour. After the designated heating time in the oven, each sample was removed and taped to a flat counter surface using double side sticky tape to flatten and smooth out the sample for accurate length and width measurement. Shrinkage is measured in the both the Machine direction (MD) and Transverse direction (TD) direction and is expressed as a % MD shrinkage and % TD shrinkage.

Pore Size
Pore size is measured using the Aquapore available through Porous Materials, Inc. (PMI). Pore size is expressed in μm.

Porosity
The porosity of a microporous film sample is measured using ASTM method D-2873 and is defined as the percentage void spaces in a microporous membrane measured in both Machine Direction (MD) and Transverse Direction (TD).

Dielectric Breakdown (DB)
Voltage is applied to a separator membrane until the dielectric breakdown of the sample is observed. Strong separators show high DB. Any non-uniformity in the separator membrane leads to lower DB values.

Compression Elasticity
Compression elasticity modulus was evaluated using the TMA Q400 and a hemi-sphere probe. A 5 mm×5 mm sample is compressed at a constant rate up to 1 N (568 N/cm2), then the pressure is released at a constant rate back down to 0 N at ambient temperature. Percentage of dimension change during compression and recovery are estimated based on the initial thickness of the sample Mixed Penetration
Mixed Penetration is the force required to create a short through a separator when placed between cathode and anode materials. This test is used to indicate the tendency of a separator to allow short circuits during the battery assembly. Details of this method are described in US 2010/209758.

Cycling
All cycling was done in constant current (CC) mode. Cathode used is 523 NMC. Anode used is superior graphite. Electrolyte used 1 M LiPF$_6$ salt in 3:7 v:v EC:EMC solvent. Voltage window is 3.0-4.3 V. Cycles 1-5 have charge rate and discharge rate of C/10. Cycles 6-10 have a charge rate and discharge rate of C/5. Cycles 11-15 have a charge rate of C/5 and a discharge rate of C/2. Cycles 16-20 have a charge rate of C/5 and a discharge rate of 1 C (charge/discharge rate capacity; 1 C is a rate of full charge or discharge in 60 minutes). Cycles 21-25 have a charge rate of C/5 and a discharge rate of 5 C. Cycles 26-30 have a charge rate of C/5 and a discharge rate of 10 C. Cycles 31-35 have a charge rate and discharge rate of C/10.

We claim:

1. A battery separator for a lithium battery comprising:
   at least one dry-process microporous polymer membrane comprising a plurality of co-extruded porous polymer microlayers with a thickness of less than 2 microns; and
   at least two other dry-process microporous polymer membranes, wherein
   the at least one dry-process microporous polymer membrane comprising a plurality of co-extruded porous polymer microlayers with a thickness of less than 2 microns and the at least two other dry process microporous polymer membranes are laminated to one another.

2. The battery separator of claim 1 wherein the at least two other dry-process microporous polymer membranes comprise at least one selected from a monolayer dry-process microporous polymer membrane and another dry-process microporous polymer membrane comprising a plurality of porous polymer microlayers having a thickness of less than 2 microns.

3. The battery separator of claim 2, wherein at least three microporous dry-process polymer membranes of co-extruded polymer microlayers with a thickness of less than 2 microns are laminated together to form the battery separator.

4. The battery separator of claim 3, wherein the at least three said microporous dry-process polymer membranes of co-extruded polymer microlayers with a thickness less than 2 microns each comprise at least three polymer microlayers.

5. The battery separator of claim 1 wherein said at least one microporous polymer dry-process membrane comprising a plurality of co-extruded porous polymer microlayers with a thickness of less than 2 microns has at least three microlayers with a thickness of less than 2 microns.

6. The battery separator of claim 1 wherein at least one of said microporous dry-process polymer membranes of co-extruded polymer microlayers of less than 2 microns is made of one or more polyolefins.

7. The battery separator of claim 1 wherein at least one of said microporous dry-process polymer membranes of co-extruded polymer microlayers is made up of coextruded dry-process polyolefin microlayers with a thickness of less than 2 microns.

8. A lithium battery comprising the battery separator of claim 1.

9. A secondary lithium battery comprising the battery separator of claim 1.

10. A battery separator comprising one or more dry-process microporous polymer co-extruded multi-microlayer-membranes with the microlayers having a thickness of less than 2 microns, wherein the one or more dry-process microporous polymer co-extruded multi-microlayer membranes with microlayers having a thickness of less than 2 microns are laminated to at least two other dry-process polymer membranes, which may be a dry-process microporous polymer co-extruded multi-microlayer-membranes with microlayers having a thickness of less than 2 microns, and wherein the battery separator provides at least one of the following: improved strength in comparison to a conventional trilayer membrane, improved shutdown in comparison to a conventional trilayer membrane, and a reduced propensity to split in comparison to a conventional trilayer membrane.

11. A lithium battery comprising the battery separator of claim 10.

12. A separator membrane comprises one or more dry-process co-extruded multi-microlayer polymer membranes laminated to at least two other dry-process polymer membranes, which may be another dry-process co-extruded multi-microlayer polymer membrane, wherein the separator membrane exhibits at least one of the following: improved strength in comparison to a conventional trilayer membrane, improved puncture strength in comparison to a conventional trilayer membrane, improved shutdown in comparison to a conventional trilayer membrane, and a reduced propensity to split in comparison to a conventional trilayer membrane.

13. A lithium battery comprising the separator membrane of claim 12.

* * * * *